United States Patent
Chueh et al.

(10) Patent No.: US 7,408,753 B2
(45) Date of Patent: Aug. 5, 2008

(54) SURGE-PROTECTED NETWORKING POWER STRIP

(75) Inventors: Her-Jun Chueh, Taipei (TW); Chih-Hsun Lin, Taipei (TW); Kuang-Che Chen, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 116 days.

(21) Appl. No.: 10/884,629

(22) Filed: Jul. 2, 2004

(65) Prior Publication Data

US 2005/0002142 A1 Jan. 6, 2005

(30) Foreign Application Priority Data

Jul. 4, 2003 (TW) .............. 92118422 A

(51) Int. Cl.
*H01C 7/12* (2006.01)

(52) U.S. Cl. .................. 361/91.1; 361/119
(58) Field of Classification Search ........... 361/91.1, 361/118, 119; 455/128, 462
See application file for complete search history.

(56) References Cited

U.S. PATENT DOCUMENTS

| | | | |
|---|---|---|---|
| 3,943,356 A * | 3/1976 | Schmutzer et al. ........... 378/94 |
| 4,636,771 A * | 1/1987 | Ochs ......................... 455/402 |
| 4,785,195 A | 11/1988 | Rochelle et al. |
| 5,359,540 A | 10/1994 | Ortiz |
| 5,835,326 A * | 11/1998 | Callaway ................... 361/111 |
| 6,445,087 B1 | 9/2002 | Wang et al. |
| 6,452,482 B1 | 9/2002 | Cern |
| 6,452,923 B1 * | 9/2002 | Gerszberg et al. .......... 370/352 |
| 6,590,493 B1 * | 7/2003 | Rasimas et al. ......... 340/538.12 |
| 6,661,634 B2 * | 12/2003 | Roberts et al. .............. 361/119 |
| 6,741,162 B1 * | 5/2004 | Sacca et al. ................... 307/3 |
| 6,747,859 B2 * | 6/2004 | Walbeck et al. ............ 361/93.1 |
| 6,868,552 B1 * | 3/2005 | Masuda et al. ............. 725/125 |
| 7,183,901 B2 * | 2/2007 | Legaud ................... 340/310.13 |
| 2002/0080010 A1 * | 6/2002 | Zhang ................... 340/310.06 |
| 2003/0062990 A1 * | 4/2003 | Schaeffer et al. ....... 340/310.01 |
| 2005/0286184 A1 * | 12/2005 | Campolo .................... 361/42 |

* cited by examiner

*Primary Examiner*—Michael J Sherry
*Assistant Examiner*—Danny Nguyen
(74) *Attorney, Agent, or Firm*—Winston Hsu

(57) ABSTRACT

A surge-protected hub applied to set up an AC line networking system and used for eliminating the surge problem is provided. The surge-protected hub includes a housing; a plurality of connectors mounted on the housing and electrically connected to an alternating-current power source for independently establishing connections to power lines for power transmission or network lines for networking signal transmission; and a surge-protected device disposed in the housing and arranged upstream of the plurality of connectors for filtering out surge signals that are received from the alternating-current power source while allowing networking signals having a frequency range lying in the frequency range of the surge signals to pass therethrough.

13 Claims, 5 Drawing Sheets

SURGE-PROTECTED NETWORKING POWER STRIP

FIELD OF THE INVENTION

The present invention relates to a networking power strip, and more particularly to a surge-protected networking power strip applied to communicate networking signals over power lines.

BACKGROUND OF THE INVENTION

To date, network is widely used everywhere, from offices to home. The most used network system is illustrated in FIG. 1. A plurality of personal computers (PCs) 10 are successfully connected by means of a network hub 11 or a main server. The hub 11 or main server is further connected to a modem 12 such as an asymmetric digital subscriber line (ADSL) modem or a cable modem so that the computers 10 can access data from the internet via the telephone lines 13 or cables. A splitter 14 is necessary for the modem 12 to share the telephone lines 13 with the telephone 15. The splitter 14 filters out the high frequency signals to maintain high quality in telephone communication.

However, it is always a troublesome work to install a network cabling system in an office or a house without beforehand layout. There are a lot of difficulties in additional network cabling inside the floor or wall. It will be much simpler to lay the cables on the surface of the floor or the wall. Even though the cables are possibly arranged at corners, it is still unsightly and may adversely affect the pass by the floor. In an alternative network system, the networking signals are transmitted via existing electric wires. Please refer to FIG. 2 in which an AC line networking system is shown. The networking signals are transmitted via the existing AC lines 22. The power line adapters 21, each of which has a power plug at one end and an RJ45 or USB connector at the other end, are connected between the personal computers 20 and the utility power sockets 23 to establish a small local area network (LAN). Since electric wire layout is generally more popular than telephone line layout, the network system conducted via electric wires will simplify the network cabling task. U.S. Pat. No. 6,445,087 B1 assigned to the same assignee discloses such a network system, which is incorporated herein for reference.

The network system conducted via electric wires, however, suffers from the surge problem. The surge currents transmitted on the AC lines will significantly affect the communication quality of the networking signals.

SUMMARY OF THE INVENTION

Therefore, the present invention provides a surge-protected hub in the form of a surge-protected networking power strip for eliminating the surge problem.

In accordance with a first aspect of the present invention, the surge-protected networking hub includes a housing; a plurality of connectors mounted on the housing and electrically connected to an alternating-current power source for independently establishing connections to power lines for power transmission or network lines for networking signal transmission; and a surge-protected device disposed in the housing and arranged upstream of the plurality of connectors for filtering out surge signals that are received from the alternating-current power source while allowing networking signals having a frequency range lying in the frequency range of the surge signals to pass therethrough.

Preferably, the frequency range of the networking signals is from 4.3 MHz to 20.9 MHz. The surge-protected device includes a low-pass filter and a band-pass filter electrically interconnected in parallel.

In an embodiment, the surge-protected hub is a surge-protected networking power strip and the connectors are power outlets.

Preferably, the surge-protected hub includes a power plug extending from the housing and electrically connected to the alternating-current power source.

In an embodiment, the surge-protected hub further includes at least one telephone jack mounted on the housing for establishing a connection to a telephone line or a network line. Under this condition, the surge-protected hub preferably includes an asymmetric digital subscriber line (ADSL) filter disposed in the housing and electrically connected to the telephone jack for filtering out high-frequency signals transmitted in the telephone line.

In an embodiment, two of the connectors are used for establishing connections to the power line and the network line of a computer respectively.

According to a second aspect of the present invention, the surge-protected hub includes a housing; a plurality of connectors mounted on the housing and electrically connected to an alternating-current power source for independently establishing connections to power lines for power transmission or network lines for networking signal transmission; a low-pass filter disposed in the housing and arranged upstream of the plurality of connectors for filtering out surge signals that are received from the alternating-current power source; and a band-pass filter disposed in the housing and arranged upstream of the plurality of connectors for passing networking signals therethrough.

Preferably, the networking signals have a frequency range lying in the frequency range of the surge signals to be filtered out by the low-pass filter.

A third aspect of the present invention relates to a surge-protected networking power strip applied to an electronic apparatus, which includes a housing; a power plug extending from the housing and electrically connected to an alternating-current power source; a plurality of power outlets mounted on the housing and electrically connected to the power plug for independently establishing connections to power lines for power transmission or network lines for networking signal transmission; and a surge-protected device electrically connected between the power plug and the plurality of power outlets for filtering out surge signals that are received from the alternating-current power source while allowing networking signals having a frequency range lying in the frequency range of the surge signals to pass therethrough.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
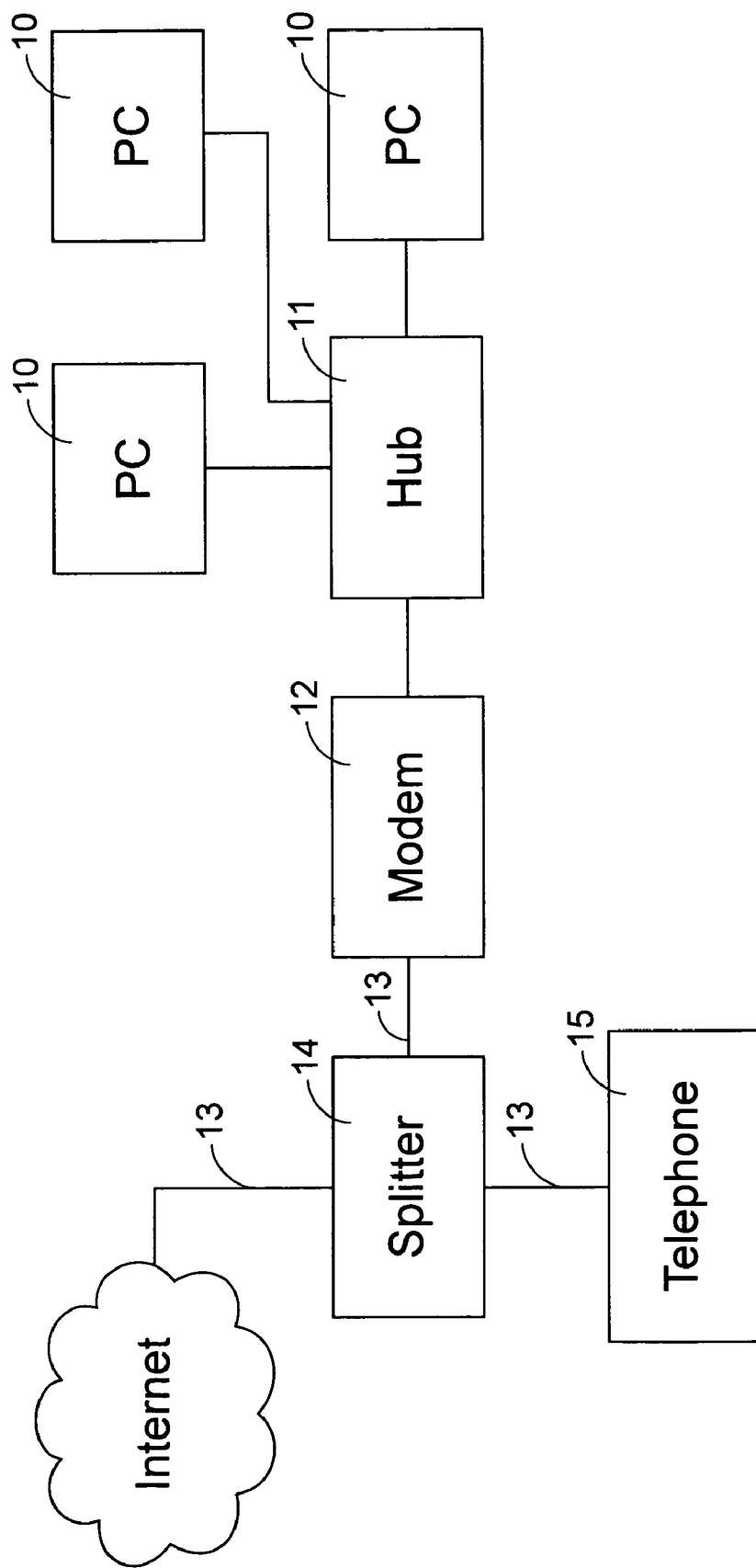
FIG. 1 is a block diagram illustrating a conventional network system conducted via the telephone system.
Figure 2:
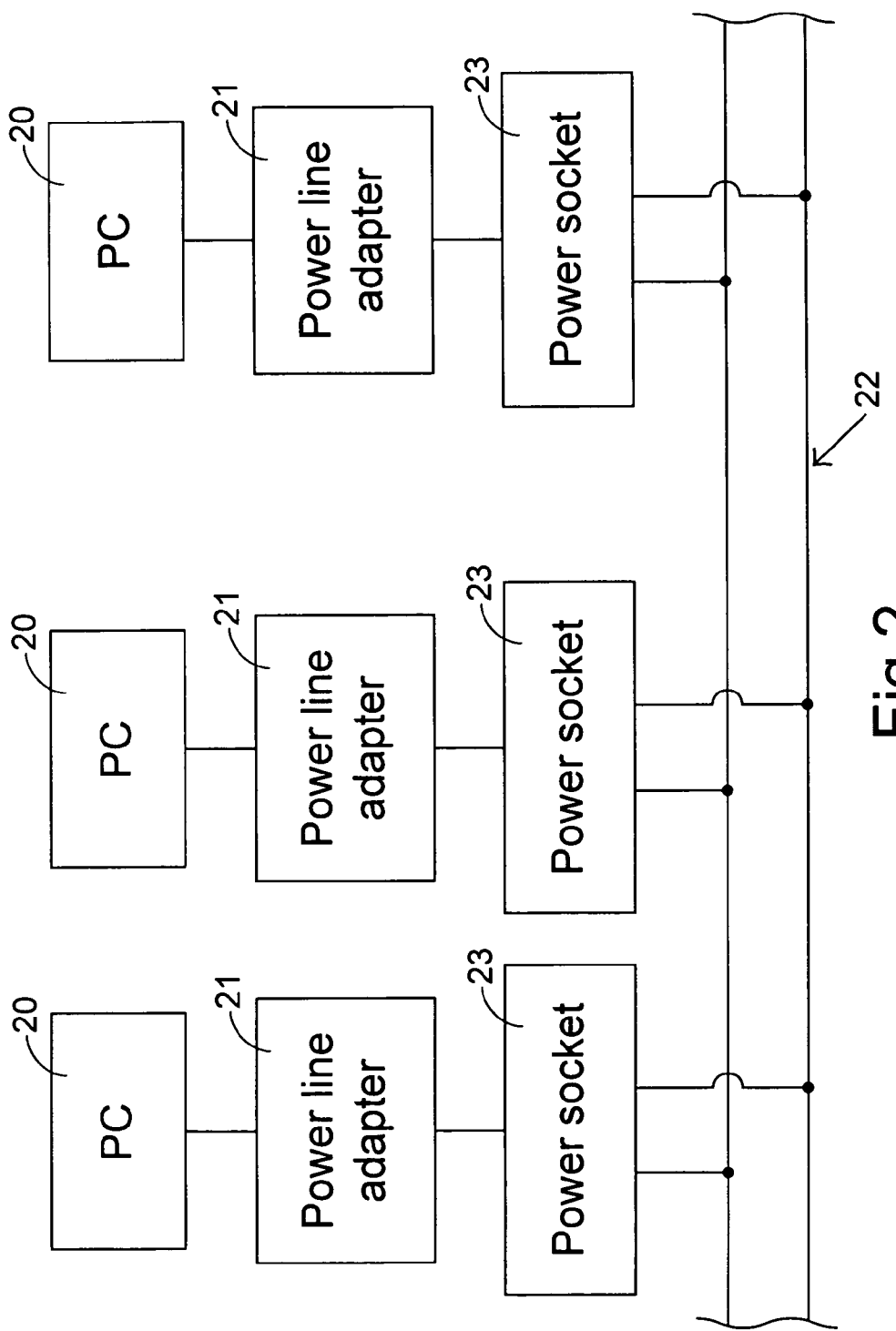
FIG. 2 is a block diagram illustrating another conventional network system conducted via power lines.
Figure 3:
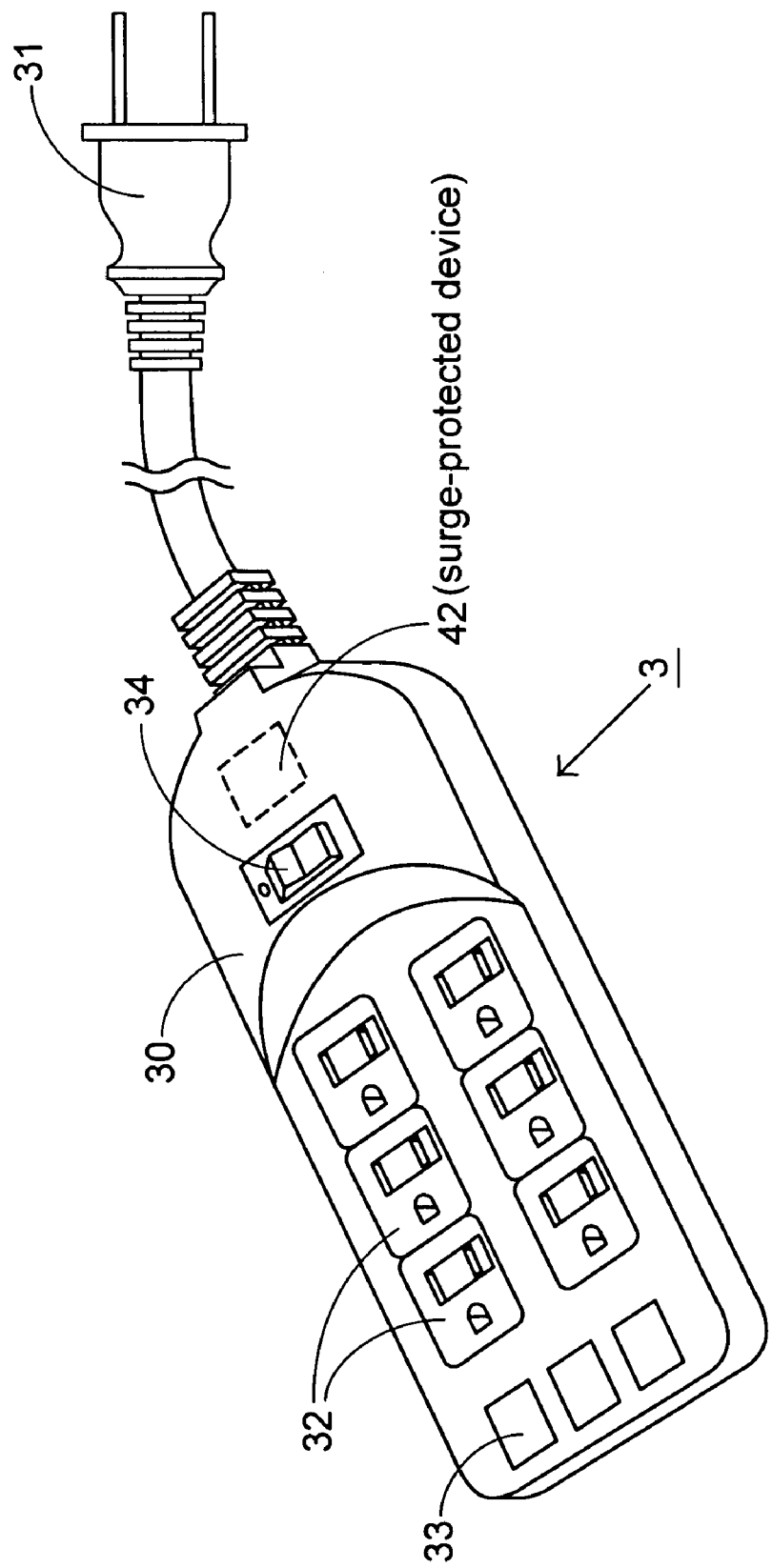
FIG. 3 is a schematic diagram illustrating the appearance of a serge-protected networking power strip according to an embodiment of the present invention.
Figure 4:
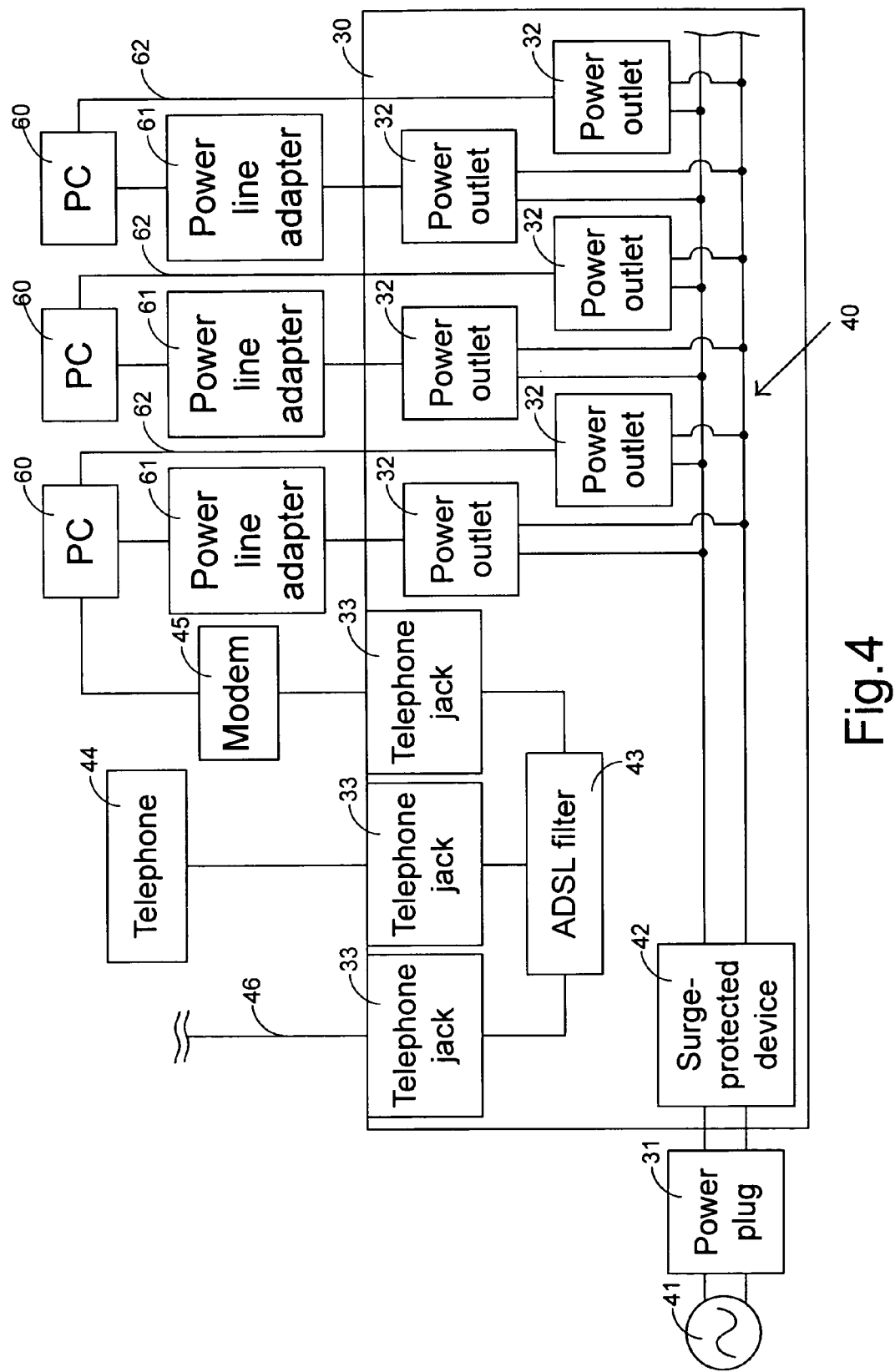
FIG. 4 is a block diagram illustrating a network system conducted via the networking power strip according to an embodiment of the present invention.

Please refer to FIGS. 3 and 4. A networking power strip 3 according to an embodiment of the present invention obtains power from an alternating-current (AC) power source 41, e.g. that supplied by the power company, by plugging the extended power plug 31 into a power socket (not shown) previously laid in the office or the house. The networking power strip 3 includes a plurality of power outlets 32 and telephone jacks 33 mounted on the housing 30. Each of the power outlets 32 is provided for receiving therein a power line or a network line of a network node apparatus such as a computer 60 or another electronic apparatus. For example, both the power line 62 and the network line 61 of a computer 60 can be plugged into two of the power outlets 32 to receive power signals and networking signals from the networking power strip 3, respectively. On the other hand, each of the telephone jacks 33 are provided for receiving therein a telephone/network line 46 to establish a connection to a telephone 44 or an asymmetric digital subscriber line (ADSL) modem 45. For filtering out the high-frequency signals transmitted in the telephone line 46 to keep satisfactory telephone communication quality, an ADSL filter 43 is preferably included in the networking power strip 3 and coupled to the telephone jacks 33. The switch 34 is used for switching the networking power strip 3 between an on-circuit state and an off-circuit state. The networking power strip 3 further includes a surge-protected device 42 for filtering out surge signals that are received from the alternating-current power source while allowing networking signals to pass therethrough.

In this embodiment, a power line adapter 61 functioning as the network line is provided between the computer 60 and the power outlets 32. Each of the power line adapters 61 has an RJ45 or USB connector connected to the network socket of the personal computer 60 and a power plug end plugged into the power outlet 32. Hence, the computers 60 may access data from the internet or local area network (LAN) and obtain power from the AC power source 41 through the power/networking signal transmission line 40.

Figure 5:
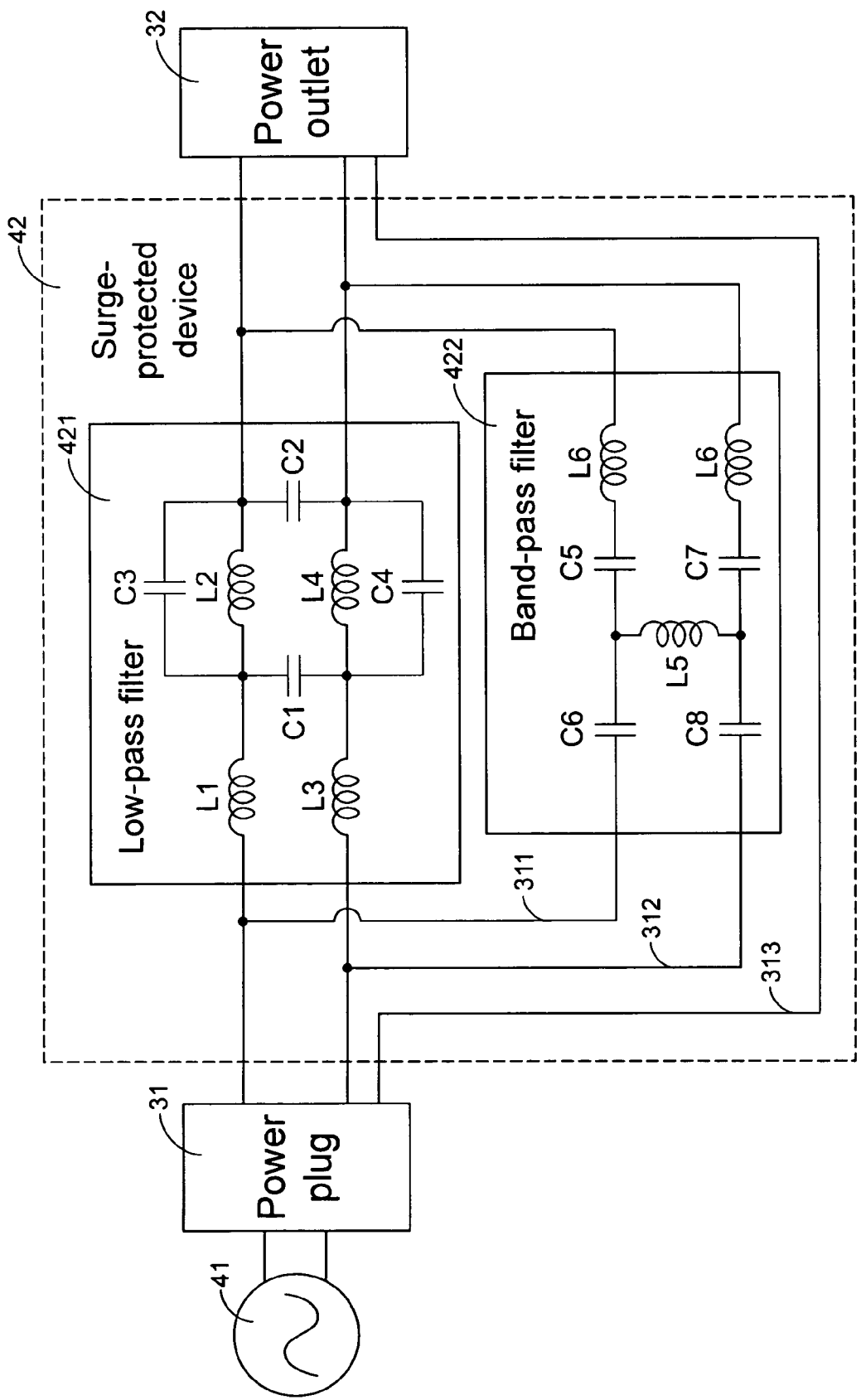
FIG. 5 is a circuit block diagram illustrating an embodiment of a surge-protected device built in the networking power strip of FIG. 4.

After the power and/or networking signals are inputted into the networking power strip 3 from the power plug 31 and before they are transmitted into the power outlets 32 via the power/networking signal transmission line 40, they are processed by the surge-protected device 42. The surge-protected device 42 is disposed in the housing 30 and arranged upstream of the power outlets 32. As shown in FIG. 5, an embodiment of the surge-protected device 42 includes a low-pass filter 421 and a band-pass filter 422 electrically interconnected in parallel. Through the low-pass filter 421, the high-frequency surge portion of the power signals received from the AC power source 41 are absorbed and decayed to protect all the electronic apparatuses connected to the power outlets 32. Through the band-pass filter 422, the networking signals, although generally having a frequency range from 4.3 MHz to 20.9 MHz, which lies in the frequency range of the surge to be filtered out, can pass the surge-protected device 42 to be received by the computer 60 via the power/networking signal transmission line 40, the power outlet 32 and the power line adapter 61. In FIG. 5, the numeral references 311, 312 and 313 indicate a fire line, neutral line and ground line, respectively. In one embodiment, an asymmetric digital subscriber line (ADSL) filter 43 is provided in the housing 30 and coupled to the telephone jacks 33 to filter out the high frequency signals to maintain high quality in telephone communication while an ADSL modem is used for transmitting the networking signals through the telephone jack 33. Based on such design, the networking power strip 3 can be applied to different network systems cooperated with the electric wire layout or telephone line layout.

According to the above description, it is understood that the use of the surge-protected power strip serving as a hub simplifies the set up task of a network system conducted via an existing power system. The surge-protected function protects the computers while maintaining a satisfactory quality of network communication. Based on or using the present invention, the surge-protected power strip can be flexibly applied to build a network system as desired.

While the invention has been described in terms of what is presently considered to be the most practical and preferred embodiments, it is to be understood that the invention needs not be limited to the disclosed embodiment. On the contrary, it is intended to shield various modifications and similar arrangements included within the spirit and scope of the appended claims which are to be accorded with the broadest interpretation so as to encompass all such modifications and similar structures.

What is claimed is:

1. A partially surge-protecting hub for communicating networking signals over power lines, comprising:

a housing;

a plurality of connectors mounted on said housing and electrically connected to an alternating-current power source for independently establishing connections to power lines for power transmission or network lines for networking signal transmission, wherein two of said connectors are used for establishing connections to the power line and the network line of a computer respectively; and a partially surge-protecting device disposed in said housing and arranged upstream of said plurality of connectors for partially filtering out surge signals that are received from said alternating-current power source while allowing networking signals having a frequency range lying in the frequency range of said surge signals to pass therethrough, wherein said partially surge-protecting device comprises a low-pass filter and a band-pass filter;

at least one telephone jack mounted on said housing for establishing a connection to a telephone line or network line; and an asymmetric digital subscriber line (ADSL) filter disposed in said housing and electrically connected to said telephone jack for partially filtering out high-frequency signals transmitted in said telephone line.

2. The partially surge-protecting hub according to claim 1 wherein the frequency range of said networking signals is from 4.3 MHz to 20.9 MHz.

3. The partially surge-protecting hub according to claim 1 wherein said low-pass filter and said band-pass filter are electrically interconnected in parallel.

4. The partially surge-protecting hub according to claim 1 wherein said partially surge-protecting hub is a partially surge-protecting networking power strip and said connectors are power outlets.

5. The partially surge-protecting hub according to claim 4 further comprising a power plug extending from said housing and electrically connected to said alternating-current power source.

6. A partially surge-protecting hub for communicating networking signals over power lines, comprising:
   a housing;
   a plurality of connectors mounted on said housing and electrically connected to an alternating-current power source for independently establishing connections to power lines for power transmission or network lines for networking signal transmission, wherein two of said connectors are used for establishing connections to the power line and the network line of a computer respectively;
   a low-pass filter disposed in said housing and arranged upstream of said plurality of connectors for partially filtering out surge signals that are received from said alternating-current power source;
   a band-pass filter disposed in said housing and arranged upstream of said plurality of connectors for passing networking signals therethrough;
   at least one telephone jack mounted on said housing for establishing a connection to a telephone line or network line; and
   an asymmetric digital subscriber line (ADSL) filter disposed in said housing and electrically connected to said telephone jack for partially filtering out high-frequency signals transmitted in said telephone line.

7. The partially surge-protecting hub according to claim 6 wherein said networking signals have a frequency range lying in the frequency range of surge signals to be filtered out by said low-pass filter.

8. The partially surge-protecting hub according to claim 6 wherein said low-pass filter and said band-pass filter are electrically interconnected in parallel.

9. The partially surge-protecting hub according to claim 6 wherein said partially surge-protecting hub is a partially surge-protecting networking power strip and said connectors are power outlets.

10. The partially surge-protecting hub according to claim 9 further comprising a power plug extending from said housing and electrically connected to said alternating-current power source.

11. A partially surge-protecting networking power strip applied to an electronic apparatus, comprising:
    a housing;
    a power plug extending from said housing and electrically connected to an alternating-current power source;
    a plurality of power outlets mounted on said housing and electrically connected to said power plug for independently establishing connections to power lines for power transmission or network lines for networking signal transmission, wherein two of said power outlets are used for establishing connections to the power line and the network line of a computer respectively; and
    a partially surge-protecting device electrically connected between said power plug and said plurality of power outlets for partially filtering out surge signals that are received from said alternating-current power source while allowing networking signals having a frequency range lying in the frequency range of said surge signals to pass therethrough, wherein said partially surge-protecting device comprises a low-pass filter and a band-pass filter;
    at least one telephone jack mounted on said housing for establishing a connection to a telephone line or network line; and
    an asymmetric digital subscriber line (ADSL) filter disposed in said housing and electrically connected to said telephone jack for partially filtering out high-frequency signals transmitted in said telephone line.

12. The partially surge-protecting networking power strip according to claim 11 wherein the frequency range of said networking signals is from 4.3 MHz to 20.9 MHz.

13. The partially surge-protecting networking power strip according to claim 11 wherein said low-pass filter and said band-pass filter are electrically interconnected in parallel.

\* \* \* \* \*